March 28, 1950     J. O. CREEK     2,502,206
PRESSURE FLUID COUPLING
Filed Oct. 4, 1946
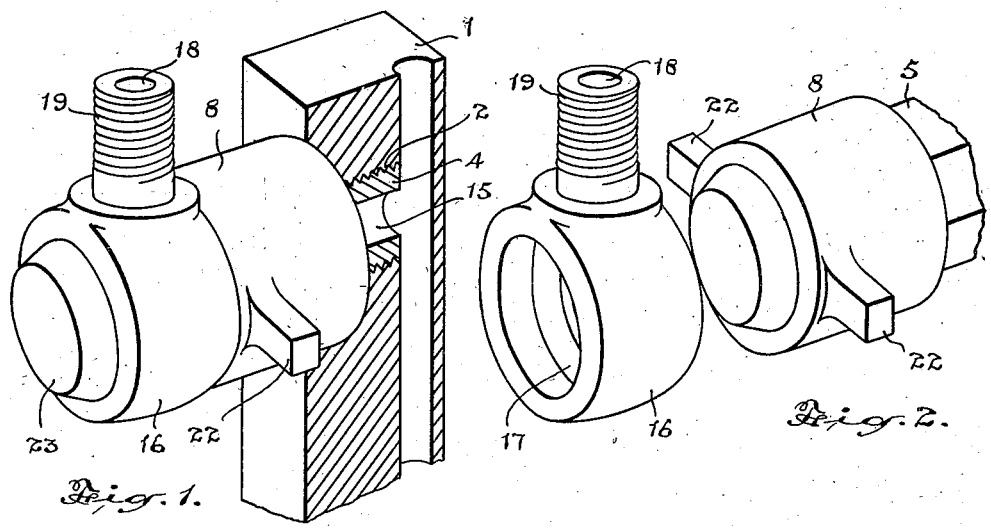
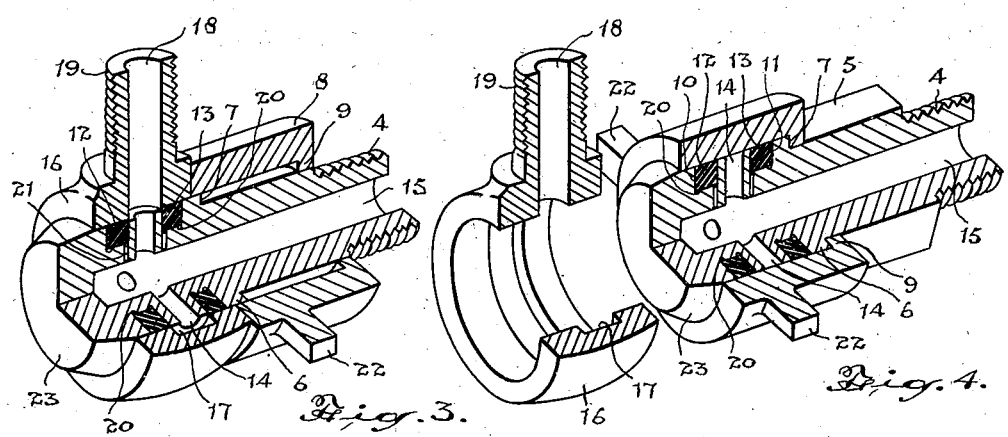
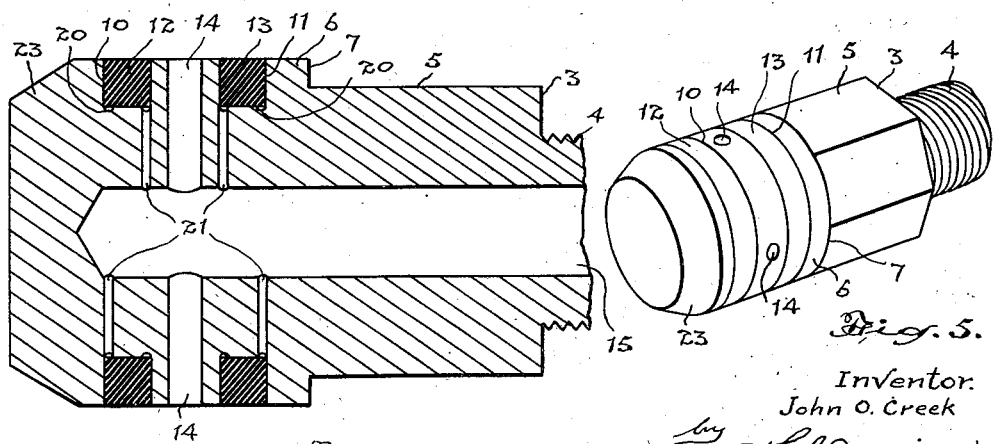
Inventor:
John O. Creek Patented Mar. 28, 1950

2,502,206

UNITED STATES PATENT OFFICE 2,502,206

PRESSURE FLUID COUPLING

John O. Creek, Brampton, Ontario, Canada

Application October 4, 1946, Serial No. 701,129

4 Claims. (Cl. 284—17)

This invention relates to couplings for connecting branch lines to main feed lines carrying a pressure fluid and the principal object of the invention is to provide a coupling which will permit a branch leading to a fluid pressure operated tool to be connected or disconnected instantaneously with the pressure supply without requiring the use of tools of any kind.

A further object is to provide a pressure fluid supply line with a plurality of discharge laterals, each of which is effectively sealed by a closure member which will be displaced simultaneously with the placing of a coupling to connect a branch line thereto.

A still further object is to provide a coupling which will permit extraordinary freedom of movement of lateral or branch lines without disconnecting the coupling and without creating leakage.

The principal feature of the invention consists in providing a pressure fluid supply conduit with hollow cylindrical extensions having lateral discharge ports, a branch line sleeve coupling slidably and removably embracing said ported cylinder and adapted to conduct pressure fluid therefrom, and a sleeve mounted on said ported cylinder adapted to displace said sleeve coupling and seal the ports of said cylinder.

In the accompanying drawings—

Figure 1 is a perspective view of a coupling constructed in accordance with this invention shown applied to a sectional main fluid pressure line.

Figure 2 is a perspective view showing the displaceable portions of the branch line coupling removed from the pressure fluid branch.

Figure 3 is a perspective quarter sectional view taken through the assembled fitting shown in Figure 1.

Figure 4 is a perspective quarter sectional view of the structure as illustrated in Figure 2.

Figure 5 is a perspective view of the end of one of the lateral or fluid supply branches with the branch coupling and also the sealing ring removed.

Figure 6 is an enlarged perspective detail of a fluid branch and sealing ring.

Many industrial and commercial establishments have adopted the use of pressure fluid operated tools and other equipment and fluid pressure pipe lines or conduits are fed with pressure fluid from a main source and taps are arranged in suitable positions throughout these lines.

It is a particular purpose of this invention to provide means which will permit instantaneous coupling of branch lines at various points throughout a main pressure feed line, and as herein shown the main feed line 1 has threaded openings 2 arranged at suitable locations throughout its length in which are secured the branch extensions 3. Each of these branches is provided with a threaded end 4 and a polyangular portion 5 permitting the use of a wrench to tighten the threaded portion in the main supply line.

Extending beyond the angular portion 5 is a cylindrical part 6, which is of greater diameter than the polyangular part 5, and forms a shoulder 7 at the outer end of the part 5.

A cylindrical sleeve 8 rotatably encircles the cylindrical part 6 and is provided with an inturned flange 9 at one end which engages the shoulder 7 and forms a limiting stop to the outward movement of the sleeve.

The cylindrical portion 6 is formed with a pair of spaced-apart annular grooves 10 and 11 in which are mounted annular rubber rings 12 and 13 respectively.

Between the annular rings are arranged a plurality of radial holes 14 which extend inwardly to an axially bored orifice 15 extending inwardly from the threaded end of the member 3.

A cylindrical sleeve 16 is adapted to fit snugly over the perimeter of the cylindrical part 6 of the member 3 and the periphery of the rubber rings 12 and 13 engage in sealing contact with the inner wall of this member when it is inserted over the cylindrical part 6 of the member 3.

An annular groove 17 is formed in the inner wall of the member 16 midway of its length which extends between the sealing rings 12 and 13 and communicates with the radial holes 14 in which a fluid flowing through the axial hole 15 of each of the extensions and the radial holes 14, flows through the annular groove 17 to a radial orifice 18 extending through a nipple 19 to which a branch tube leading to a suitable tool or implement is connected.

The bottom of the grooves 10 is provided with narrow annular grooves 20 arranged adjacent to each side wall and the inward of these grooves adjacent to the holes 14 are connected by small holes 21 with the axial orifice 15 so that fluid pressure flows radially outward to press against the inner perimeter of each of the rings 12 and 13 to force them outwardly in pressure contact with the inner perimeter of the sleeve 16 to which the branch conduit is connected.

It will thus be seen that the pressure fluid will flow freely from the main line through the branch members 3 and, flowing through the central orifices thereof to the radial holes 14, such pressure fluid flows to the branches and the rings 12 and 13 effectively seal the fluid against leakage, while permitting the sleeve 16 to be rotated freely.

When the member 16 is in position on the cylindrical outer end of the branch extension 3 the sleeve member 8 rests in the inward position illustrated in Figures 1 and 3.

The sleeve member 8 is here shown provided with a pair of laterally extending lugs 22 about which the fingers of the hand may be easily gripped, and when it is desired to remove the extension sleeve 16 it is merely necessary to hook the fingers about the lugs 22 and pull the sleeve 8 outwardly. The sliding movement may be assisted materially by giving the sleeve a rotary movement. The sleeve when thus pulled outward pushes the member 16 to slide it off the cylindrical part 6 of the member 3, and the member 8, having the same internal diameter as the member 16, slips over the cylindrical part 6 and over the rings 12 and 13.

The pressure fluid is thus simultaneously cut off from the channelled branch connection and sealed by the sleeve 8 as such sleeve is moved to the position illustrated in Figure 2. This sleeve is contacted inside by the sealing rings 12 and 13 and escape of the pressure fluid is prevented.

When it is desired to attach a coupling in the form of the member 16 connected with a tool or instrument it is merely necessary to insert the ring 16 over the outer end 23 of the member 3 and by direct inward pressure the sleeve 8 is moved inwardly while being displaced by the member 16 which slips over the sealing rings 13 and 12 and connects the annular passage in the member 16 with the branch line, while the sleeve 8 is moved inwardly to an inactive position.

It will be seen from this description that, where a main supply line of pressure fluid is carried throughout a plant and provided with numerous branch extensions, an operator of a machine may couple up with the main pressure fluid line at a point close to his work by simply pushing the sleeve end of the tube of his instrument over the branch extension. Then when he is through he simply pulls outwardly on the sleeve 8, disconnecting the member 16 and automatically sealing the discharge passages.

No tools are required; there is no loss of pressure at any time in the main line through leakage due to faulty connection and the couplings automatically seal.

Coupling devices such as described are extremely simple and inexpensive to manufacture and will save a great deal of time of the operator in connecting and disconnecting tools from the supply line.

What I claim as my invention is:

1. A pressure fluid coupling comprising a hollow cylinder adapted to be connected to a pressure fluid conduit and having lateral discharge ports, a displaceable branch line sleeve coupling slidably and removably mounted embracing said ported cylinder and rotatable thereon and formed with a groove adapted to register with said ports, peripheral fluid pressure operated sealing means carried by said cylinder and forming a seal with said branch line sleeve each side of said groove, said sealed groove conducting pressure fluid from said cylinder, and slidable means mounted on said ported cylinder adapted to displace said sleeve coupling and seal the ports of said cylinder.

2. A coupling as claimed in claim 1 having annular grooves arranged in the outer wall of said hollow cylinder either side of said ports, minor annular grooves arranged in the bottom of the aforesaid grooves adjacent the inward edges thereof, radial passages extending inwardly from said minor grooves to the interior of said hollow cylinder, and said sealing means comprises a solid rubber ring arranged in each of said annular grooves and adapted to extend beyond the perimeter of the hollow cylinder and engage in sealing contact with the sleeve coupling and having the edges thereof adjacent said branch line sleeve groove urged into sealing contact with said branch line sleeve by fluid pressure in said cylinder to preclude fluid flow laterally in either direction from said branch sleeve groove.

3. A coupling as claimed in claim 1 in which the slidable means mounted on said hollow cylinder comprises a sleeve provided with lateral lug extensions and with a stop flange at one end, and the cylinder is formed with a shoulder to engage said flange said latter sleeve being engaged by said fluid pressure operated sealing means upon displacement of said branch line sleeve to effect a seal of said discharge ports.

4. A pressure fluid coupling comprising a hollow cylinder adapted to be connected to a pressure fluid conduit and having radial discharge ports in the wall thereof, annular grooves arranged in said cylinder either side of said discharge ports, minor grooves formed in the bottoms of the aforesaid grooves adjacent said discharge ports and in communication with the interior of said cylinder annular sealing rings mounted in the first-mentioned grooves, a displaceable branch line sleeve coupling slidably and removably mounted embracing said ported cylinder and rotatable thereon, said sleeve being formed with an inner annular groove adapted to register with the lateral discharge ports and to conduct pressure fluid therefrom, the inner walls of said rotatable sleeve either side of the inner annular groove forming a seal with said sealing rings expanded and urged into contact therewith at their inner peripheral edges adjacent said discharge ports under pressure fluid entering said minor grooves, and slidable means to displace said sleeve and to be engaged by said fluid pressure expanded rings to seal the ports of said cylinder.

JOHN O. CREEK.

REFERENCES CITED

The following references are of record in the file of this patent:

UNITED STATES PATENTS

| Number | Name | Date |
| --- | --- | --- |
| 711,609 | Woodnall | Oct. 21, 1902 |
| 794,110 | McDowell | July 5, 1905 |
| 1,052,088 | Prettyman | Feb. 4, 1913 |
| 1,059,563 | Richards | Apr. 22, 1913 |
| 1,803,578 | Weatherhead | May 5, 1931 |
| 2,109,511 | Simon | Mar. 1, 1938 |
| 2,393,679 | Gunderson | Jan. 29, 1946 |